United States Patent
Ko et al.

(10) Patent No.: US 12,404,364 B2
(45) Date of Patent: Sep. 2, 2025

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Gun Ko, Daejeon (KR); Tae Hun Kwon, Daejeon (KR); Yiseul Jun, Daejeon (KR); Jae Chan Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 720 days.

(21) Appl. No.: 17/630,848

(22) PCT Filed: Jul. 8, 2021

(86) PCT No.: PCT/KR2021/008717
§ 371 (c)(1),
(2) Date: Jan. 27, 2022

(87) PCT Pub. No.: WO2022/045574
PCT Pub. Date: Mar. 3, 2022

(65) Prior Publication Data
US 2022/0372214 A1 Nov. 24, 2022

(30) Foreign Application Priority Data
Aug. 28, 2020 (KR) .................. 10-2020-0109155
Jul. 7, 2021 (KR) .................. 10-2021-0088900

(51) Int. Cl.
| | |
|---|---|
| *C08G 63/183* | (2006.01) |
| *B29C 45/00* | (2006.01) |
| *C08L 25/12* | (2006.01) |
| *C08L 55/02* | (2006.01) |
| *B29K 9/06* | (2006.01) |
| *B29K 67/00* | (2006.01) |

(52) U.S. Cl.
CPC ........ *C08G 63/183* (2013.01); *B29C 45/0001* (2013.01); *C08L 25/12* (2013.01); *C08L 55/02* (2013.01); *B29K 2009/06* (2013.01); *B29K 2067/006* (2013.01); *C08L 2201/08* (2013.01); *C08L 2203/30* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 5,093,419 A | 3/1992 | Kodama et al. | |
| 2010/0168315 A1* | 7/2010 | Park ................. | C08L 67/00 525/77 |
| 2010/0249314 A1* | 9/2010 | Park ................. | C08L 51/04 525/203 |
| 2017/0275444 A1 | 9/2017 | Sohn et al. | |

FOREIGN PATENT DOCUMENTS

| | | |
|---|---|---|
| CN | 101851430 | 10/2010 |
| CN | 102181122 | 9/2011 |
| EP | 0387864 A2 | 9/1990 |
| EP | 0614945 A2 | 9/1994 |
| JP | H08-134325 A | 5/1996 |
| JP | H08-225723 A | 9/1996 |
| KR | 10-0033471 B | 6/1990 |
| KR | 10-1998-0046811 A | 9/1998 |
| KR | 10-2004-0062254 A | 7/2004 |
| KR | 10-2010-0067223 A | 6/2010 |
| KR | 10-2010-0078694 A | 7/2010 |
| KR | 20110013888 | 2/2011 |
| KR | 20110013888 A | 2/2011 |
| KR | 10-2011-0054574 A | 5/2011 |
| KR | 10-2014-0117445 A | 10/2014 |
| KR | 10-2015-0067691 A | 6/2015 |
| KR | 20150067691 | 6/2015 |
| KR | 10-2015-0078316 A | 7/2015 |
| KR | 20150078316 | 7/2015 |
| KR | 10-2016-0022257 A | 2/2016 |
| KR | 10-2017-0045029 A | 4/2017 |

* cited by examiner

*Primary Examiner* — Robert S Jones, Jr.
*Assistant Examiner* — Lily K Sloan
(74) *Attorney, Agent, or Firm* — Bryan Cave Leighton Paisner LLP (57) ABSTRACT

A thermoplastic resin composition for automotive interior materials including 20% to 42% by weight of a polyester resin (A); 20% to 32% by weight of a vinyl cyanide compound-conjugated diene compound-aromatic vinyl compound graft copolymer (B); and 30% to 48% by weight of an aromatic vinyl compound-vinyl cyanide compound copolymer (C), a method of preparing the thermoplastic resin composition, and a molded article including the thermoplastic resin composition. The thermoplastic resin composition has excellent environmental stress cracking (ESC), processability, injection moldability, injection stability, and economics while maintaining mechanical properties, thermal stability, and friction noise resistance equal or superior to those of conventional heat-resistant ABS resin compositions.

12 Claims, 2 Drawing Sheets

THERMOPLASTIC RESIN COMPOSITION, METHOD OF PREPARING THE SAME, AND MOLDED ARTICLE INCLUDING THE SAME

CROSS-REFERENCE TO RELATED APPLICATIONS

This application is a U.S. national phase of international application No. PCT/KR2021/008717, filed on Jul. 8, 2021, and claims priority to Korean Patent Application No. 10-2020-0109155, filed on Aug. 28, 2020, and Korean Patent Application No. 10-2021-0088900, filed on Jul. 7, 2021, in the Korean Intellectual Property Office, the disclosures of each of which are incorporated herein by reference.

TECHNICAL FIELD

The present invention relates to a thermoplastic resin composition, a method of preparing the same, and a molded article including the same. More particularly, the present invention relates to a thermoplastic resin composition having excellent environmental stress cracking (ESC), processability, injection moldability, injection stability, and economics while maintaining mechanical properties, thermal stability, and friction noise resistance equal or superior to those of conventional heat-resistant ABS resin compositions. The thermoplastic resin composition is thus suitable for automotive interior materials.

BACKGROUND

ABS resins are acrylonitrile-butadiene-styrene terpolymers, and have excellent impact resistance, rigidity, chemical resistance, and processability. Due to these advantages, ABS resins have been used in various fields such as electricity/electronics, architecture, and automobiles. However, since ABS resins lack heat resistance compared to engineering plastics, use thereof is limited in electric/electronic products and automotive interior materials that require heat resistance.

In particular, due to excellent mechanical properties and low production cost thereof, PC/ABS materials are widely used in various applications such as automobiles and electric/electronics. For automotive applications, PC/ABS materials are mainly used for interior materials such as a center fascia and a door trim. However, because PC/ABS materials are amorphous, an intrinsic property of the PC/ABS materials is poor chemical resistance, which limits use thereof. Meanwhile, in the field of automotive interior materials, environmental stress cracking (ESC) caused by chemical products is a chronic and serious quality problem. In particular, problems such as occurrence of cracks are frequently caused by chemicals frequently used inside automobiles. To prevent these problems, there is increasing demand for materials having excellent chemical resistance and injection moldability.

Therefore, there is a need to develop a material that has excellent injection moldability and injection stability while improving the chemical resistance of a material used for automotive interior materials.

RELEVANT PATENT DOCUMENTS

KR 10-00334710000 B1

SUMMARY

The present invention has been made in view of the above problems, and it is an objective of the present invention to provide a thermoplastic resin composition having excellent chemical resistance, processability, injection moldability, and injection stability while maintaining mechanical properties, thermal stability, and friction noise resistance equal or superior to those of conventional heat-resistant ABS resin compositions.

It is another objective of the present invention to provide a method of preparing the thermoplastic resin composition.

It is yet another objective of the present invention to provide a molded article manufactured using the thermoplastic resin composition.

The above and other objectives can be accomplished by the present invention described below.

In accordance with one aspect of the present invention, provided is a thermoplastic resin composition including 20% to 42% by weight of a polyester resin (A); 20% to 32% by weight of a vinyl cyanide compound-conjugated diene compound-aromatic vinyl compound graft copolymer (B); and 30% to 48% by weight of an aromatic vinyl compound-vinyl cyanide compound copolymer (C).

In addition, the present invention may provide a thermoplastic resin composition including 20% to 42% by weight of a polyester resin (A); 20% to 32% by weight of a vinyl cyanide compound-conjugated diene compound-aromatic vinyl compound graft copolymer (B); and 30% to 48% by weight of an aromatic vinyl compound-vinyl cyanide compound copolymer (C), wherein the polyester resin (A) has an intrinsic viscosity of 0.95 dl/g to 1.4 dl/g.

In addition, the present invention may provide a thermoplastic resin composition including 20% to 42% by weight of a polyester resin (A); 20% to 32% by weight of a vinyl cyanide compound-conjugated diene compound-aromatic vinyl compound graft copolymer (B); 30% to 48% by weight of an aromatic vinyl compound-vinyl cyanide compound copolymer (C); and 0.1% to 5% by weight of a lubricant (D).

In addition, the present invention may provide a thermoplastic resin composition including 20% to 42% by weight of a polyester resin (A); 20% to 32% by weight of a vinyl cyanide compound-conjugated diene compound-aromatic vinyl compound graft copolymer (B); and 30% to 48% by weight of an aromatic vinyl compound-vinyl cyanide compound copolymer (C), wherein an average of injection metering deviations of 30 shots of the thermoplastic resin composition at an injection temperature of 230° C. and a mold temperature of 50° C. using a 600MT injection machine (ENGEL Co.) is 19.1 seconds or less.

In addition, the present invention may provide a thermoplastic resin composition including 20% to 42% by weight of a polyester resin (A); 20% to 32% by weight of a vinyl cyanide compound-conjugated diene compound-aromatic vinyl compound graft copolymer (B); and 30% to 48% by weight of an aromatic vinyl compound-vinyl cyanide compound copolymer (C), wherein the thermoplastic resin composition has a flexural strength of 60 MPa or more and a flexural modulus of 1,800 MPa or more as measured using a specimen having a thickness of ⅛" at a span of 64 mm and a test speed of 2 mm/min according to ISO 178.

In accordance with another aspect of the present invention, provided is a method of preparing a thermoplastic resin composition, the method including melt-kneading and extruding 20% to 42% by weight of a polyester resin (A), 20% to 32% by weight of a vinyl cyanide compound-conjugated diene compound-aromatic vinyl compound graft copolymer (B), and 30% to 48% by weight of an aromatic vinyl compound-vinyl cyanide compound copolymer (C) at 200° C. to 250° C. and 200 rpm to 300 rpm.

In addition, the present invention may provide a method of preparing a thermoplastic resin composition, the method including melt-kneading and extruding 20% to 42% by weight of a polyester resin (A), 20% to 32% by weight of a vinyl cyanide compound-conjugated diene compound-aromatic vinyl compound graft copolymer (B), and 30% to 48% by weight of an aromatic vinyl compound-vinyl cyanide compound copolymer (C) at 200° C. to 250° C. and 200 rpm to 300 rpm, wherein the polyester resin (A) has an intrinsic viscosity of 0.95 dl/g to 1.4 dl/g.

In addition, the present invention may provide a method of preparing a thermoplastic resin composition, the method including melt-kneading and extruding 20% to 42% by weight of a polyester resin (A), 20% to 32% by weight of a vinyl cyanide compound-conjugated diene compound-aromatic vinyl compound graft copolymer (B), 30% to 48% by weight of an aromatic vinyl compound-vinyl cyanide compound copolymer (C), and 0.1% to 5% by weight of a lubricant (D) at 200° C. to 250° C. and 200 rpm to 300 rpm.

In addition, the present invention may provide a method of preparing a thermoplastic resin composition, the method including melt-kneading and extruding 20% to 42% by weight of a polyester resin (A), 20% to 32% by weight of a vinyl cyanide compound-conjugated diene compound-aromatic vinyl compound graft copolymer (B), and 30% to 48% by weight of an aromatic vinyl compound-vinyl cyanide compound copolymer (C) at 200° C. to 250° C. and 200 rpm to 300 rpm to prepare a thermoplastic resin composition, wherein an average of injection metering deviations of 30 shots of the thermoplastic resin composition at an injection temperature of 230° C. and a mold temperature of 50° C. using a 600MT injection machine (ENGEL Co.) is 19.1 seconds or less.

In addition, the present invention may provide a method of preparing a thermoplastic resin composition, the method including melt-kneading and extruding 20% to 42% by weight of a polyester resin (A), 20% to 32% by weight of a vinyl cyanide compound-conjugated diene compound-aromatic vinyl compound graft copolymer (B), and 30% to 48% by weight of an aromatic vinyl compound-vinyl cyanide compound copolymer (C) at 200° C. to 250° C. and 200 rpm to 300 rpm to prepare a thermoplastic resin composition, wherein the prepared thermoplastic resin composition has a flexural strength of 60 MPa or more and a flexural modulus of 1,800 MPa or more as measured using a specimen having a thickness of ⅛" under conditions of a span of 64 mm and a test speed of 2 mm/min according to ISO 178.

In accordance with yet another aspect of the present invention, provided is a molded article including the thermoplastic resin composition.

The present invention has an effect of providing a thermoplastic resin composition having excellent chemical resistance, processability, injection moldability, and injection stability while maintaining mechanical properties, thermal stability, and friction noise resistance. The thermoplastic resin composition is, thus, suitable for automotive interior materials.

DETAILED DESCRIPTION

Hereinafter, a thermoplastic resin composition, a method of preparing the same, and a molded article including the same according to the present invention will be described in detail.

The present inventors confirmed that, when a polyester resin having a predetermined intrinsic viscosity, a vinyl cyanide compound-conjugated diene compound-aromatic vinyl compound graft copolymer, and an aromatic vinyl compound-vinyl cyanide compound copolymer were included within a predetermined content range, chemical resistance, processability, injection moldability, and injection stability were improved while mechanical properties, such as impact strength, tensile strength, and elongation, thermal stability, and friction noise resistance were maintained. Based on these results, the present inventors conducted further studies to complete the present invention.

The thermoplastic resin composition of the present invention will be described in detail as follows.

The thermoplastic resin composition of the present invention includes 20% to 42% by weight of a polyester resin (A); 20% to 32% by weight of a vinyl cyanide compound-conjugated diene compound-aromatic vinyl compound graft copolymer (B); and 30% to 48% by weight of an aromatic vinyl compound-vinyl cyanide compound copolymer (C). In this case, all of chemical resistance, processability, injection moldability, and injection stability may be excellent while mechanical properties, thermal stability, and friction noise resistance are maintained at an appropriate level. In addition, economics may be improved through cost reduction. With these advantages, the thermoplastic resin composition may be suitable for automotive interior materials.

Hereinafter, each component of the thermoplastic resin composition of the present invention will be described in detail.

(A) Polyester Resin

For example, based on a total weight of the thermoplastic resin composition, the polyester resin (A) may be included in an amount of 20% to 42% by weight, preferably 25% to 40% by weight, more preferably 30% to 40% by weight. Within these ranges, chemical resistance, processability, injection moldability, and injection stability may be improved while mechanical properties, thermal stability, and friction noise resistance are maintained.

For example, the polyester resin (A) may have an intrinsic viscosity of 0.95 dl/g to 1.4 dl/g, preferably 1 dl/g to 1.35 dl/g, more preferably 1.05 dl/g to 1.35 dl/g, still more preferably 1.15 dl/g to 1.35 dl/g. Within these ranges, a composition may have excellent tensile strength and flexural modulus, and due to proper melt index thereof, the composition may have excellent processability, moldability, and molding stability. When the intrinsic viscosity of the polyester resin (A) exceeds 1.4 dl/g, fluidity may be reduced, thereby degrading injection moldability. When the intrinsic viscosity of the polyester resin (A) is less than 0.95 dl/g, gas generation may increase, thereby degrading surface properties.

In this specification, when intrinsic viscosity is measured, unless noted otherwise, a sample to be measured is completely dissolved in methylene chloride, and then is filtered using a filter to obtain a filtrate. Then, using the obtained filtrate, intrinsic viscosity is measured at 20° C. using an Ubbelohde viscometer.

For example, the polyester resin (A) may include one or more selected from the group consisting of polyethylene adipate (PEA), polybutylene succinate (PBS), polyethylene terephthalate (PET), polybutylene terephthalate (PBT), polytrimethylene terephthalate (PTT), and polyethylene naphthalate (PEN), preferably polybutylene terephthalate. In this case, the overall mechanical properties of a composition may be good, so that physical property balance may be excellent and molding may be easily performed.

As the polybutylene terephthalate resin, commonly-used polybutylene terephthalate resins may be used without particular limitation. For example, the polybutylene terephthalate resin may be a polymer prepared by polycondensation of 1,4-butanediol and dimethyl terephthalate.

Methods of preparing a polyester resin commonly used in the art to which the present invention pertains may be used to prepare the polyester resin (A), without particular limitation.

(B) Vinyl Cyanide Compound-Conjugated Diene Compound-Aromatic Vinyl Compound Graft Copolymer For example, based on a total weight of the thermoplastic resin composition, the vinyl cyanide compound-conjugated diene compound-aromatic vinyl compound graft copolymer (B) may be included in an amount of 20% to 32% by weight, preferably 22% to 32% by weight, more preferably 24% to 32% by weight. Within these ranges, chemical resistance, processability, injection moldability, and injection stability may be excellent while mechanical properties, thermal stability, and friction noise resistance are maintained.

For example, the vinyl cyanide compound-conjugated diene compound-aromatic vinyl compound graft copolymer (B) may be a copolymer prepared by graft-polymerizing 1% to 20% by weight of a vinyl cyanide compound, 40% to 80% by weight of conjugated diene rubber, and 10% to 40% by weight of an aromatic vinyl compound, preferably a copolymer prepared by graft-polymerizing 1% to 15% by weight of a vinyl cyanide compound, 50% to 70% by weight of conjugated diene rubber, and 20% to 35% by weight of an aromatic vinyl compound, more preferably a copolymer prepared by graft-polymerizing 5% to 15% by weight of a vinyl cyanide compound, 55% to 65% by weight of conjugated diene rubber, and 25% to 35% by weight of an aromatic vinyl compound. Within these ranges, mechanical properties and processability may be excellent.

For example, the vinyl cyanide compound-conjugated diene compound-aromatic vinyl compound graft copolymer (B) may have a grafting degree of 30% to 50%, preferably 35% to 45%. Within these ranges, mechanical properties and processability may be excellent.

In this specification, when a grafting degree is measured, graft polymer latex is coagulated, washed, and dried to obtain powdered graft polymer latex, and 30 ml of acetone is added to 2 g of the powdered graft polymer latex, followed by stirring for 24 hours. Then, ultracentrifugation is performed to separate insoluble matter that is not dissolved in acetone, followed by drying at 60° C. to 120° C. Then, the weight of the insoluble matter is measured. The measured value is substituted into Equation 1 to calculate a grafting degree:

Grafting degree (%)=[Weight of grafted monomers (g)/Rubber weight (g)]×100.   [Equation 1]

In Equation 1, the weight of grafted monomers (g) is obtained by subtracting rubber weight (g) from the weight of insoluble substances (gel) obtained by dissolving a graft copolymer in acetone and performing centrifugation, and the rubber weight (g) is the weight (g) of rubber components theoretically added to graft copolymer powder.)

For example, the conjugated diene rubber may have an average particle diameter of 600 Å to 3,500 Å, preferably 1,000 Å to 3,000 Å, more preferably 1,500 Å to 2,500 Å. Within these ranges, mechanical properties and processability may be improved.

In this specification, unless noted otherwise, average particle diameter may be measured by dynamic light scattering, and specifically, may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000- to 5,000-fold with distilled water, i.e., a sample is diluted appropriately so as not to deviate significantly from an intensity setpoint of 300 kHz and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 psec.

For example, the vinyl cyanide compound-conjugated diene compound-aromatic vinyl compound graft copolymer (B) may have a weight average molecular weight of 70,000 g/mol to 100,000 g/mol, preferably 75,000 g/mol to 85,000 g/mol. Within these ranges, due to adequate fluidity, processability and impact resistance may be excellent.

In this specification, weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. Specifically, the weight average molecular weight is a weight average molecular weight (Mw) converted based on polystyrene by gel permeation chromatography (GPC, PL GPC220, Agilent Technologies). More specifically, weight average molecular weight is measured through gel permeation chromatography (GPC, Waters 2410 RI detector, 515 HPLC pump, 717 auto sampler). 0.02 g of each polymer is dissolved in 20 ml of tetrahydrofuran (THF), filtered using a 0.45 µm filter, and placed in a GPC vial (4 ml) to prepare each sample. From 1 hour before start of measurement, the solvent (THF) is injected at a rate of 1.0 mL/min, and measurement is performed under conditions of a measurement time of 25 minutes, an injection volume of 150 µL, a flow rate of 1.0 ml/min, an isocratic pump mode, and an RI detector (condition: 40). At this time, calibration may be performed using a polystyrene standard (PS), and data processing may be performed using ChemStation.

The weight of the polyester resin (A) is preferably not less than that of the vinyl cyanide compound-conjugated diene compound-aromatic vinyl compound graft copolymer (B), more preferably greater than that of the vinyl cyanide compound-conjugated diene compound-aromatic vinyl compound graft copolymer (B). In this case, all of heat resistance, chemical resistance, light resistance, and noise resistance may be excellent while mechanical properties are maintained, and the thermoplastic resin composition may be excellent in terms of an average of injection metering deviations. In addition, economics may be improved through cost reduction, and the thermoplastic resin composition may be suitable for automotive interior materials.

In this specification, for example, the conjugated diene compound may include one or more selected from the group consisting of 1,3-butadiene, 2,3-dimethyl-1,3-butadiene, 2-ethyl-1,3-butadiene, 1,3-pentadiene, and isoprene.

In this specification, for example, the vinyl cyanide compound may include one or more selected from the group consisting of acrylonitrile, methacrylonitrile, ethylacrylonitrile, and isopropylacrylonitrile.

In this specification, for example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromo styrene, p-bromo styrene, m-bromo styrene, o-chloro styrene, p-chloro styrene, m-chloro styrene, vinyl toluene, vinyl xylene, fluorostyrene, and vinyl naphthalene.

Methods of preparing a graft copolymer commonly used in the art to which the present invention pertains may be used to prepare the graft copolymer (B), without particular limitation. For example, the graft copolymer (B) may be prepared by suspension polymerization, emulsion polymerization, solution polymerization, or bulk polymerization, preferably emulsion polymerization.

(C) Aromatic Vinyl Compound-Vinyl Cyanide Compound Copolymer

For example, based on a total weight of the thermoplastic resin composition, the aromatic vinyl compound-vinyl cyanide compound copolymer (C) may be included in an amount of 30% to 48% by weight, preferably 33% to 45% by weight, more preferably 35% to 43% by weight. Within these ranges, chemical resistance, processability, injection moldability, and injection stability may be excellent while mechanical properties, thermal stability, and friction noise resistance are maintained.

For example, the aromatic vinyl compound-vinyl cyanide compound copolymer (C) may be a copolymer prepared by polymerizing 60% to 80% by weight of an aromatic vinyl compound and 20% to 40% by weight of a vinyl cyanide compound, preferably a copolymer prepared by polymerizing 65% to 75% by weight of an aromatic vinyl compound and 25% to 35% by weight of a vinyl cyanide compound. Within these ranges, processability and injection stability may be excellent while mechanical properties and friction resistance are maintained.

For example, the aromatic vinyl compound-vinyl cyanide compound copolymer (C) may have a weight average molecular weight of 120,000 g/mol to 150,000 g/mol, preferably 130,000 g/mol to 140,000 g/mol. Within these ranges, processability and injection stability may be excellent while mechanical properties and friction resistance are maintained.

For example, the aromatic vinyl compound-vinyl cyanide compound copolymer (C) may be a styrene-acrylonitrile copolymer (SAN resin), an α-methylstyrene-acrylonitrile copolymer (heat-resistant SAN resin), or a mixture thereof, more preferably a styrene-acrylonitrile copolymer (SAN resin). In this case, processability and injection stability may be excellent while mechanical properties and friction resistance are maintained.

Methods of preparing a copolymer commonly used in the art to which the present invention pertains may be used to prepare the aromatic vinyl compound-vinyl cyanide compound copolymer (C) without particular limitation. For example, the aromatic vinyl compound-vinyl cyanide compound copolymer (C) may be prepared by suspension polymerization, emulsion polymerization, solution polymerization, or bulk polymerization, preferably bulk polymerization. In this case, heat resistance and fluidity may be excellent.

(D) Lubricant

For example, based on a total weight of the thermoplastic resin composition, the thermoplastic resin composition may include the lubricant (D) in an amount of 0.1% to 5% by weight, preferably 0.1% to 3% by weight, more preferably 0.5% to 2.5% by weight, still more preferably 0.7% to 2% by weight, most preferably 1% to 1.5% by weight. Within these ranges, injection moldability and injection stability may be excellent without degrading mechanical properties. In particular, in injection metering, measurement time (seconds) and deviation for each shot may be reduced. When the content of the lubricant (D) is less than the above ranges or exceeds the above ranges, mechanical properties and heat resistance may be degraded, and the average and standard deviation of injection metering deviations may be increased, thereby degrading injection moldability and injection stability.

For example, the lubricant (D) may include one or more selected from the group consisting of fatty acid amide-based lubricants and polyethylene-based wax. In this case, injection moldability and injection stability may be excellent.

The lubricant (D) is preferably a fatty acid amide-based lubricant. In this case, mechanical properties and thermal stability may be excellent, and the average and standard deviation of injection metering deviations may be reduced, thereby further improving injection moldability and injection stability.

More preferably, the fatty acid amide-based lubricants may include one or more selected from the group consisting of stearamide, behenamide, ethylenebis(stearamide), N,N'-ethylenebis(12-hydroxystearamide), erucamide, oleamide, and ethylenebis(oleamide), still more preferably ethylenebis(stearamide). In this case, mechanical properties may be excellent, and the average and standard deviation of injection metering deviations may be reduced, thereby further improving injection moldability and injection stability.

Thermoplastic Resin Composition

In the case of the thermoplastic resin composition, an average of injection metering deviations of 30 shots at an injection temperature of 230° C. and a mold temperature of 50° C. using a 600MT injection machine (ENGEL Co.) is preferably 19.1 seconds or less, more preferably 18.1 seconds or less, still more preferably 16 seconds or less, still more preferably 13.5 seconds or less, still more preferably 10 to 13.5 seconds. Within these ranges, physical property balance, injection processability, and injection stability may be excellent.

In this specification, the 600MT injection machine has a clamping force of 600 tons. An injection machine having the above clamping force may be appropriately selected and used within a range commonly practiced in the art. However, the present invention is not particularly limited thereto.

In addition, in the case of the thermoplastic resin composition, a standard deviation of injection metering deviations of 30 shots at an injection temperature of 230° C. and a mold temperature of 50° C. using a 600MT injection machine (ENGEL Co.) is preferably 2.6 seconds or less, more preferably 2.3 seconds or less, still more preferably 1.5 seconds or less, still more preferably 1.3 seconds or less, still more preferably 0.75 seconds to 0.95 seconds. Within these ranges, physical property balance, injection processability, and injection stability may be excellent.

For example, the thermoplastic resin composition may have an Izod impact strength of 17 kJ/m$^2$ or more, preferably 35 kJ/m$^2$ or more, more preferably 38 to 52 kJ/m$^2$, still more preferably 38 kJ/m$^2$ to 50 kJ/m$^2$ as measured at 23° C. using a notched specimen according to ISO 180/1A. Within these ranges, the balance of all physical properties may be excellent.

For example, the thermoplastic resin composition may have a fluidity (melt flow rate) of 5 g/10 min or more, preferably 5 g/10 min to 32 g/10 min, more preferably 5 g/10 min to 25 g/10 min, still more preferably 5 g/10 min to 20 g/10 min, still more preferably 6 g/10 min to 15 g/10 min, still more preferably 6 g/10 min to 12 g/10 min as measured at 230° C. and 10 kg according to ISO 1133. Within these ranges, the balance of all physical properties, processability, and injection moldability may be excellent.

For example, the thermoplastic resin composition may have a tensile strength of 35 MPa or more, preferably 40 MPa or more, more preferably 40 MPa to 50 MPa, still more preferably 40 MPa to 45 MPa as measured under conditions of 50 mm/min according to ISO 527. Within these ranges, the balance of all physical properties may be excellent.

For example, the thermoplastic resin composition may have a flexural strength of 55 MPa or more, preferably 55 MPa to 70 MPa, more preferably 60 MPa to 65 MPa as measured using a specimen having a thickness of 1/8" at a span of 64 mm and a test speed of 2 mm/min according to ISO 178. Within these ranges, the balance of all physical properties and mechanical strength may be excellent.

For example, the thermoplastic resin composition may have a flexural modulus of 1,700 MPa or more, preferably 1,700 MPa to 2,000 MPa, more preferably 1,800 MPa to 1,950 MPa as measured using a specimen having a thickness of 1/8" at a span of 64 mm and a test speed of 2 mm/min according to ISO 178. In this case, the balance of all physical properties and mechanical strength may be excellent.

For example, the thermoplastic resin composition may have a heat deflection temperature of 90° C. or higher, preferably 90° C. to 100° C., more preferably 90° C. to 95° C. as measured at 0.45 MPa according to ISO 75. Within these ranges, the balance of all physical properties and heat resistance may be excellent.

For example, the thermoplastic resin composition may have a density of 1.12 g/cm³ or less, preferably 1.0 g/cm³ to 1.12 g/cm³ as measured according to ISO 1183. Within these ranges, the balance of all physical properties may be excellent.

For example, in the case of the thermoplastic resin composition, when irradiation is performed at a temperature of 89±3° C., a relative humidity of 50±5%, an irradiation dose of 84 MJ/m², and an irradiance of 0.55±0.02 W/m²·nm (wavelength range: 300 nm to 400 nm) according to MS210-05 or ISO 105, a glossy specimen may have a color difference change (ΔE) of 1.2 or less, preferably 0.5 to 1.2, more preferably 0.9 to 1.2. Within these ranges, balance of all physical properties and appearance may be excellent.

In this specification, color difference change (ΔE) may be obtained by measuring the color of a specimen using a Hunter Lab color meter and substituting the measured values into Equation 3:

$$\Delta E = \sqrt{\{(L-L')^2 + (a-a')^2 + (b-b')^2\}}.$$ [Equation 3]

For example, in the case of the thermoplastic resin composition, when irradiation is performed at a temperature of 89±3° C., a relative humidity of 50±5%, an irradiation dose of 84 MJ/m², and an irradiance of 0.55±0.02 W/m²·nm (wavelength range: 300 to 400 nm) according to MS210-05 or ISO 105, an embossed specimen may have a color difference change (ΔE) of 1.1 or less, preferably 0.5 to 1.1, more preferably 0.7 to 1.1, still more preferably 0.8 to 1. Within these ranges, balance of all physical properties and appearance may be excellent.

In this specification, a glossy specimen for measuring light resistance is prepared at an injection temperature of 230° C. to 250° C. and a mold temperature of 50° C. using a mold that is mirror surface-finished with 2,000 grit to 40,000 grit. An embossed specimen is prepared in the same manner as the above specimen except for using a mold having an embossed pattern having a size of 15 µm to 21 µm formed on the surface thereof.

In general, in the case of a conventional thermoplastic resin composition for automotive interior materials, a glossy specimen and an embossed specimen each have a color difference change (ΔE) of 2 or less as measured according to MS210-05 or ISO 105. In the case of the thermoplastic resin composition of the present invention, a glossy specimen and an embossed specimen have a color difference change (ΔE) of 1.1 or less and 1.0 or less, respectively. That is, compared to the conventional thermoplastic resin composition, the thermoplastic resin composition of the present invention has a very low color difference change (ΔE). Thus, the thermoplastic resin composition of the present invention has superior light resistance compared to the conventional thermoplastic resin composition.

For example, when a specimen having a length of 165 mm, a width of 19 mm, and a thickness of 3.2 mm, which is identical to that of a tensile strength measurement specimen according to ASTM D638, is fixed to a jig having a stress of 2.0% according to an environmental stress cracking (ESC) test according to ISO 4599, 25 µl of a mixed solution containing isoamyl acetate, limonene, and linalool in a volume ratio of 4:1:1 is applied onto the specimen using a micropipette, and then, after 2 hours, the specimen is examined for the occurrence of crazes or cracks, the thermoplastic resin composition may have no crazes or cracks. Within these ranges, balance of all physical properties may be excellent.

In this specification, environmental stress cracking is an indicator of chemical resistance and refers to a phenomenon in which cracks and fractures occur on the surface of plastics by contact with chemicals in the presence of continuous internal and external stress.

Figure 1A:
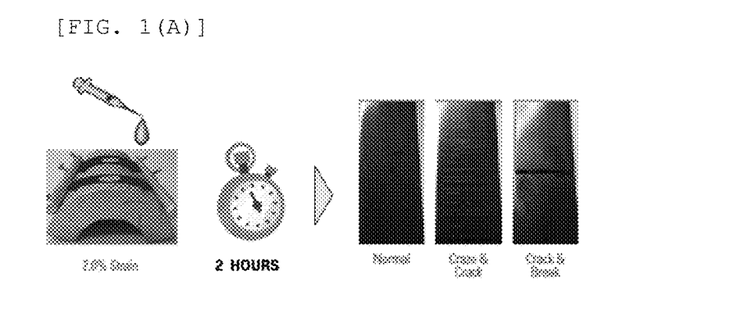
FIGS. 1(A) and 1(B) are schematic illustrations of a method for measuring environmental stress cracking (ESC), which is an index of chemical resistance.
Figure 1B:
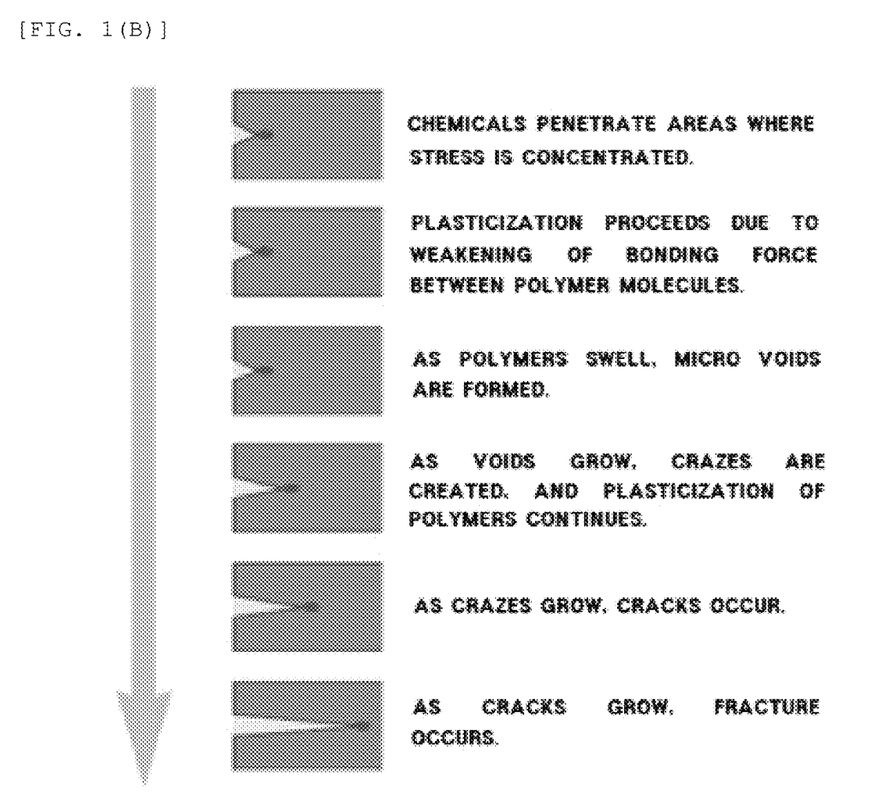

FIGS. 1(A) and 1(B) are schematic illustrations of a method for measuring environmental stress cracking (ESC), which is an index of chemical resistance. FIG. 1(A) illustrates a series of processes of fixing a specimen having a size identical to that of a tensile strength measurement specimen according to ASTM D638 to a jig having a stress of 2.0%, applying 25 µl of a mixed solution containing isoamyl acetate, limonene, and linalool in a volume ratio of 4:1:1 onto the specimen using a micropipette, and then, after 2 hours, observing the surface of the specimen. When there are no crazes or cracks on the surface of a specimen, it is marked as "Normal". When there are crazes or cracks on the surface of a specimen, it is marked as "Craze & Crack". When a specimen is broken due to cracks, it is marked as "Crack & Break". In addition, FIG. 1(B) is a flowchart of a process in which crazes or cracks are generated on the surface of a specimen, and the specimen is broken.

For example, when acceleration, impulse, frequency, friction, and fluctuation are measured using a flat specimen having a size of 70 mm×60 mm and a flat specimen having a size of 25 mm×50 mm under conditions of a specimen load of 10 N and a motion condition of 1 mm/s using a Ziegler SSP-04, and a risk priority number (RPN), which represents friction noise properties (stick-slip noise), is calculated using Equation 2, the thermoplastic resin composition may have a risk priority number (RPN) of 3 or less, preferably 1 to 3. Within these ranges, balance of all physical properties and noise resistance may be excellent.

For example, when acceleration, impulse, frequency, friction, and fluctuation are measured using a flat specimen having a size of 70 mm×60 mm and a flat specimen having a size of 25 mm×50 mm under conditions of a specimen load of 10 N and a motion condition of 4 mm/s using a Ziegler SSP-04, and a risk priority number (RPN), which represents friction noise properties (stick-slip noise), is calculated using Equation 2, the thermoplastic resin composition may have a risk priority number (RPN) of 2 or less, preferably 1 to 2. Within these ranges, balance of all physical properties and noise resistance may be excellent.

For example, when acceleration, impulse, frequency, friction, and fluctuation are measured using a flat specimen having a size of 70 mm×60 mm and a flat specimen having a size of 25 mm×50 mm under conditions of a specimen load of 40 N and a motion condition of 1 mm/s using a Ziegler SSP-04, and a risk priority number (RPN), which represents friction noise properties (stick-slip noise), is calculated using Equation 2, the thermoplastic resin composition may have a risk priority number (RPN) of 2 or less, preferably 1 to 2. Within these ranges, balance of all physical properties and noise resistance may be excellent.

For example, when acceleration, impulse, frequency, friction, and fluctuation are measured using a flat specimen having a size of 70 mm×60 mm and a flat specimen having a size of 25 mm×50 mm under conditions of a specimen load of 40 N and a motion condition of 4 mm/s using a Ziegler SSP-04, and a risk priority number (RPN), which represents friction noise properties (stick-slip noise), is calculated using Equation 2, the thermoplastic resin composition may have a risk priority number (RPN) of 2 or less, preferably 1 to 2, more preferably 1. Within these ranges, balance of all physical properties and noise resistance may be excellent.

$$RPN = \frac{2 \cdot grade_{energie\_rate} + grade_{impulse\_rate} + grade_{acceleration}}{4}.$$ [Equation 2]

<Evaluation of Friction Noise Properties>

RPN of 1 or more and 3 or less: Good (very low probability of generating friction noise).

RPN of 4 or more and 5 or less: Partially good.

RPN of 6 or more and 10 or less: Poor.

In the present invention, friction noise properties are related to buzz, squeak, and rattle (BSR) generated in a vehicle and are properties associated with aesthetics. Friction noise occurs at the assembly seam, joint, or friction area of a system, and is also called noise. Here, buzz is caused by structural vibration and is a drum-like noise generated from the panel of a part, squeak is a noise generated by friction between parts in a shear direction, and rattle is a noise generated by vertical collision between parts.

Figure 2:
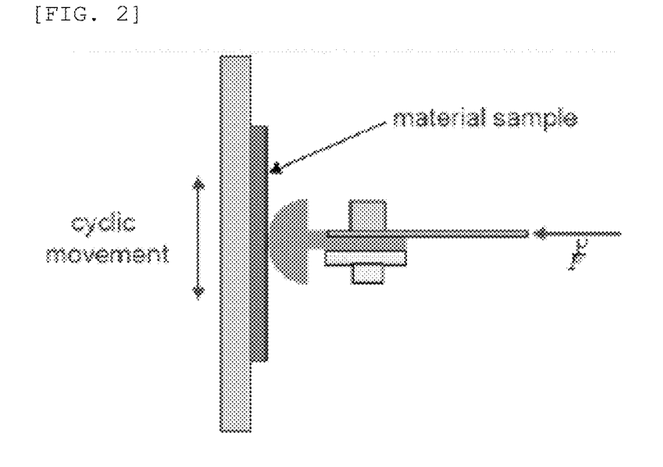
FIG. 2 is a schematic illustration of a method of measuring friction noise properties, which are indexes of noise resistance.

FIG. 2 is a schematic illustration of a method of measuring friction noise using a Ziegler SSP-04.

Specifically, friction noise is measured using a flat specimen having a size of 25 mm×50 mm and a specimen having a size of 70 mm×60 mm under four conditions: a load of 10 N and a motion condition of 1 mm/s; a load of 10 N and a motion condition of 4 mm/s; a load of 40 N and a motion condition of 1 mm/s; and a load of 40 N and a motion condition of 4 mm/s. [99] The thermoplastic resin composition preferably includes 0.1% to 5% by weight of one or more selected from the group consisting of an antioxidant and a UV absorber. Within this range, processability, light resistance, noise resistance, and chemical resistance may be improved.

For example, the antioxidant may include a phenolic antioxidant, a phosphorus antioxidant, or a mixture thereof, preferably a phenolic antioxidant. In this case, oxidation due to heat during extrusion may be prevented, and mechanical properties and heat resistance may be excellent.

For example, the phenolic antioxidant may include one or more selected from the group consisting of N,N'-hexane-1,6-diyl-bis[3-(3,5-di-t-butyl-4-hydroxyphenyl propionamide)], pentaerythritol tetrakis[3-(3,5-di-t-butyl-4-hydroxyphenyl)propionate], N,N'-hexamethylene-bis(3,5-di-t-butyl-4-hydroxy-hydrocinnamamide), triethyleneglycol-bis[3-(3-t-butyl-5-methyl-4-hydroxyphenyl)propionate], 3,5-di-t-butyl-4-hydroxybenzylphosphonate-diethylester, 1,3,5-trimethyl-2,4,6-tris(3,5-di-t-butyl-4-hydroxybenzyl) benzene, and 1,3,5-tris(4-t-butyl-3-hydroxy-2,6-dimethylbenzyl)isocyanurate. In this case, heat resistance may be greatly improved while maintaining physical property balance at a high level.

For example, the phosphorus antioxidant may include one or more selected from the group consisting of triphenylphosphite, tris(nonylphenyl)phosphite, tris(2,4-di-tert-butylphenyl) phosphite, tris(2,6-di-tert-butylphenyl)phosphite, tridecylphosphite, trioctylphosphite, trioctadecylphosphite, didecylmonophenylphosphite, dioctylmonophenylphosphite, diisopropylmonophenylphosphite, monobutyldiphenylphosphite, monodecyldiphenylphosphite, monooctyldiphenylphosphite, bis(2,6-di-tert-butyl-4-methylphenyl) pentaerythritoldiphosphite, 2,2-methylenebis(4,6-di-tert-butylphenyl)octylphosphite, bis(nonylphenyl) pentaerythritoldiphosphite, bis(2,4-di-tert-butylphenyl) pentaerythritoldiphosphite, stearylpentaerythritoldiphosphite, tributylphosphate, triethylphosphate, and trimethylphosphate.

Based on a total weight of the thermoplastic resin composition, the antioxidant is preferably included in an amount of 0.05% to 1.0% by weight, more preferably 0.1% to 0.7% by weight, still more preferably 0.1% to 0.5% by weight. Within these ranges, physical property balance may be excellent, and heat resistance may be improved.

For example, the UV absorber may include one or more selected from the group consisting of a triazine-based UV absorber, a benzophenone-based UV absorber, a benzotriazole-based UV absorber, a quinolinone-based UV absorber, a benzoate-based UV absorber, a cyanoacrylate-based UV absorber, and a benzoxazole-based UV absorber, preferably a benzotriazole-based UV absorber. In this case, physical property balance may be excellent, and light resistance may be further improved.

For example, the triazine-based UV absorber may include one or more selected from the group consisting of 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,6-diphenyl-4-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy- 4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropane-2-yloxy)phenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, 2,4,6-tris(2-hydroxy-3-methyl-4-(1-(2-ethoxyhexyloxy)-1-oxopropane-2-yloxy)phenyl)-1,3,5-triazine, 2,4-bis(2,4-dimethylphenyl)-6-(2-hydroxy-4-N-octyloxyphenyl)-1,3,5-triazine, and 2-(4,6-diphenyl-1,3,5-triazine-2-yl)-5-(2-(2-ethylhexanoyloxy)ethoxy)phenol.

For example, the benzophenone-based UV absorber may include one or more selected from the group consisting of 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydratebenzophenone, 2-hydroxy-4-dodecyloxybenzophenone, 2-hydroxy-4-octadecyloxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone, 2-hydroxy-4-methoxy-2'-carboxybenzophenone, and 4,4'-bis(diethylamino)benzophenone.

For example, the benzotriazole-based UV absorber may include one or more selected from the group consisting of 2-(2'-hydroxy-5'-methylphenyl)benzotriazole, 2-[2'-hydroxy-3',2-(2'-hydroxy-3'-tert-butyl-5'-methylphenyl)benzotriazole, 2-(2'-hydroxy-5'-methylphenyl)benzotriazole, 5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole, 2-(2'-hydroxy-3',5'-di-tert-amyl)-benzotriazole, 2-(2'-hydroxy-3',5'-di-tert-amylphenyl)-5-chlorobenzotriazole, 2-(2'-hydroxy-3'-(3",4",5",6"-tetrahydrophthalimidemethyl)-5'-methylphenyl)benzotriazole, 2-(2-hydroxy-3,5-di-tert-pentylphenyl), 2-(2'-hydroxy-5'-tert-octylphenyl)benzotriazole, and 2,2'-methylenebis[4-(1,1,3,3-tetramethylbutyl)-6-(2H-benzotriazole-2-yl)phenol.

For example, the indole-based UV absorber may be 2-[(1-methyl-2-phenyl-1H-indole-3-yl)methylene]propanedinitrile.

For example, the quinolinone-based UV absorber may be 4-hydroxy-3-[(phenylimino)methyl]-2(1H)-quinolinone.

For example, the benzoate-based UV absorber may include one or more selected from the group consisting of 2,4-di-t-butylphenyl-3',5'-di-t-butyl-4'-hydroxybenzoate, 2,6-di-t-butylphenyl-3',5'-di-t-butyl-4'-hydroxybenzoate, n-hexadecyl-3,5-di-t-butyl-4-hydroxybenzoate, and n-octadecyl-3,5-di-t-butyl-4-hydroxybenzoate.

For example, the cyanoacrylate-based UV absorber may be 2'-ethylhexyl-2-cyano-3,3-diphenylacrylate, ethyl-2-cyano-3-(3',4'-methylenedioxyphenyl)-acrylate, or a mixture thereof.

Based on a total weight of the thermoplastic resin composition, the UV absorber is preferably included in an amount of 0.05% to 1.0% by weight, more preferably 0.1% to 0.7% by weight, still more preferably 0.1% to 0.5% by weight. Within these ranges, physical property balance may be excellent, and light resistance may be further improved.

Method of Preparing Thermoplastic Resin Composition

For example, the method of preparing a thermoplastic resin composition according to the present invention includes a step of melt-kneading and extruding 20% to 42% by weight of a polyester resin (A), 20% to 32% by weight of a vinyl cyanide compound-conjugated diene compound-aromatic vinyl compound graft copolymer (B), and 30% to 48% by weight of an aromatic vinyl compound-vinyl cyanide compound copolymer (C) at 200° C. to 250° C. and 200 rpm to 300 rpm. In this case, chemical resistance, processability, injection moldability, and injection stability may be excellent while mechanical properties, thermal stability, and friction noise resistance are maintained.

For example, the method of preparing a thermoplastic resin composition may include a step of preparing the vinyl cyanide compound-conjugated diene compound-aromatic vinyl compound graft copolymer (B).

For example, the step of preparing the vinyl cyanide compound-conjugated diene compound-aromatic vinyl compound graft copolymer (B) may be a step of performing polymerization by adding 70 parts to 200 parts by weight of deionized water, 0.1 part to 2 parts by weight of an initiator, 0.1 part to 2 parts by weight of an emulsifier, and 0.05 parts to 1.5 parts by weight of a molecular weight modifier to 100 parts by weight in total of a vinyl cyanide compound, conjugated diene rubber latex, and an aromatic vinyl compound, terminating polymerization at a polymerization conversion rate of 93% to 99% by weight to prepare graft copolymer latex, and then coagulating, dehydrating, and drying the graft copolymer latex.

As a specific example, in the step of preparing the vinyl cyanide compound-conjugated diene compound-aromatic vinyl compound graft copolymer (B), based on 100 parts by weight in total of a vinyl cyanide compound, conjugated diene rubber, and an aromatic vinyl compound, a mixed solution containing 10% to 40% by weight of an aromatic vinyl compound, 1% to 20% by weight of a vinyl cyanide compound, 10 parts to 50 parts by weight of deionized water, 0.09 parts to 1.5 parts by weight of an initiator, 0.1 part to 2 parts by weight of an emulsifier, and 0.05 parts to 1.5 parts by weight of a molecular weight modifier mixed in a separate mixing apparatus is added to 40% to 80% by weight (based on solids) of conjugated diene rubber latex and 60 parts to 150 parts by weight of deionized water at 65° C. to 75° C. for 2 hours to 4 hours, and then 0.01 part to 0.5 parts by weight of an initiator is added thereto. Then, temperature is raised from 75° C. to 80° C. for 30 minutes to 90 minutes, and graft polymerization is terminated at a polymerization conversion rate of 93% to 99% by weight to obtain graft copolymer latex. The graft copolymer latex is coagulated, dehydrated, and dried. In this case, mechanical properties and processability may be excellent.

For example, the conjugated diene rubber latex included when preparing the vinyl cyanide compound-conjugated diene compound-aromatic vinyl compound graft copolymer (B) may be prepared by adding 30 parts to 100 parts by weight of deionized water, 0.5 parts to 3 parts by weight of an emulsifier, 0.01 part to 0.5 parts by weight of an electrolyte, 0.1 part to 0.5 parts by weight of a molecular weight modifier, and 0.1 part to 1 part by weight of an initiator based on 100 parts by weight of a conjugated diene compound and performing polymerization. In this case, impact resistance may be excellent.

As another example, the conjugated diene rubber latex may be prepared by adding 40 parts to 70 parts by weight of deionized water, 1 part to 2.5 parts by weight of an emulsifier, 0.05 parts to 0.3 parts by weight of an electrolyte, 0.2 parts to 0.4 parts by weight of a molecular weight modifier, and 0.3 parts to 0.8 parts by weight of an initiator based on 100 parts by weight of a conjugated diene compound and performing polymerization. In this case, impact resistance may be excellent.

For example, the emulsifier used when preparing the graft copolymer latex and the conjugated diene rubber latex may include one or more selected from the group consisting of rosin acid metal salts, alkyl aryl sulfonates, alkali methyl alkyl sulfates, sulfonated alkyl esters, and metal salts of unsaturated fatty acids.

For example, the electrolyte used when preparing the graft copolymer latex and the conjugated diene rubber latex may include one or more selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, and $Na_2HPO_4$.

For example, the initiator used when preparing the graft copolymer latex and the conjugated diene rubber latex may be a water-soluble persulfuric acid polymerization initiator, a fat-soluble polymerization initiator, or an oxidation-reduction catalyst system. For example, the water-soluble persulfuric acid polymerization initiator may include one or more selected from the group consisting of potassium persulfate, sodium persulfate, and ammonium persulfate; the fat-soluble polymerization initiator may include one or more selected from the group consisting of cumene hydroperoxide, diisopropyl benzene hydroperoxide, azobis iso butyronitrile, t-butyl hydroperoxide, paramethane hydroperoxide, and benzoylperoxide; and the oxidation-reduction catalyst system may include one or more selected from the group consisting of sodium formaldehyde sulfoxylate, sodium ethylenediamine tetraacetate, ferrous sulfate, dextrose, sodium pyrrolate, and sodium sulfite.

In the method of preparing the graft copolymer and the rubber latex, other reaction conditions, such as reaction time, reaction temperature, pressure, and time of input of reactants, other than the above-mentioned conditions, may be appropriately selected and used without particular limitation as long as the other reaction conditions are commonly used in the art to which the present invention pertains.

For example, kneading and extrusion may be performed using a single-screw extruder, a twin-screw extruder, or a Banbury mixer. In this case, due to uniform distribution of a composition, compatibility may be excellent.

For example, kneading and extrusion may be performed at a barrel temperature of 200° C. to 250° C., preferably 210° to 240° C. In this case, a throughput per unit time may be adequate, melt-kneading may be sufficiently performed, and thermal decomposition of resin components may be prevented.

For example, kneading and extrusion may be performed at screw rotation rate of 200 rpm to 300 rpm, preferably 230 rpm to 270 rpm. In this case, a throughput per unit time may be adequate, thereby improving process efficiency. In addition, excessive cutting may be suppressed.

Molded Article

For example, the molded article of the present invention may be manufactured using the thermoplastic resin composition of the present invention. In this case, chemical resistance, processability, injection moldability, and injection stability may be improved while mechanical properties, thermal stability, and friction noise resistance are maintained.

The molded article is preferably an automotive interior material, as a specific example, a center fascia or a door trim.

The method of manufacturing the molded article preferably includes a step of melt-kneading and extruding 20% to 42% by weight of a polyester resin (A), 20% to 32% by weight of a vinyl cyanide compound-conjugated diene compound-aromatic vinyl compound graft copolymer (B), and 30% to 48% by weight of an aromatic vinyl compound-vinyl cyanide compound copolymer (C) at 200° C. to 250° C. and 200 rpm to 300 rpm to prepare pellets, and a step of injecting the prepared pellets using an injection machine. Within these ranges, physical property balance and injection processability may be excellent.

In describing the thermoplastic resin composition of the present invention, the method of preparing the same, and the molded article including the same, it should be noted that other conditions or equipment not explicitly described herein may be appropriately selected within a range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows:

A-1: Polybutylene terephthalate having an intrinsic viscosity of 1.3 dl/g;

A-2: Polybutylene terephthalate having an intrinsic viscosity of 1.2 dl/g;

A-3: Polybutylene terephthalate having an intrinsic viscosity of 1.0 dl/g;

A-4: Polybutylene terephthalate having an intrinsic viscosity of 0.9 dl/g;

A-5: Polybutylene terephthalate having an intrinsic viscosity of 0.8 dl/g;

B: Acrylonitrile-butadiene-styrene graft copolymer (a graft copolymer prepared by graft-polymerizing 50% by weight of butadiene rubber, 30% by weight of styrene, and 10% by weight of acrylonitrile, grafting degree: 39%, weight average molecular weight: 78,000 g/mol);

C: Styrene-acrylonitrile copolymer (a copolymer prepared by polymerizing 71.4% by weight of styrene and 28.6% by weight of acrylonitrile, weight average molecular weight: 133,000 g/mol);

D-1: Polyethylene wax lubricant;

D-2: Ethylene bis-stearamide lubricant;

Antioxidant: Phenolic antioxidant; and

UV absorber: Hydroxyphenyl benzotriazole-based UV absorber.

Examples 1 to 11 and Comparative Examples 1 to 6

According to the amounts shown in Tables 1 to 3 below, the components shown in Tables 1 to 3 were fed into an extruder (42Ψ) to obtain pellets, and the pellets were injected to obtain specimens for measuring physical properties.

Test Examples

The properties of the specimens prepared in Examples 1 to 11 and Comparative Examples 1 to 6 were measured according to the following methods, and the results are shown in Tables 1 to 3.

Measurement Methods

Fluidity (melt flow rate): Fluidity was measured at 230° C. under a load of 10 kg for 10 minutes according to ISO 1133. Here, the unit of fluidity is "g/10 min".

Izod impact strength ($kJ/m^2$): Izod impact strength was measured at 23° C. using a notched specimen according to ISO 180/1A.

Tensile strength (MPa): Tensile strength was measured under conditions of 50 mm/min according to ISO 527.

Flexural strength (MPa) and flexural modulus (MPa): Flexural strength and flexural modulus were measured using a specimen having a thickness of ⅛" at a span of 64 mm and a test speed of 2 mm/min according to ISO 178.

Heat deflection temperature (° C.): Heat deflection temperature was measured at 0.45 MPa according to ISO 75.

Density ($g/cm^3$): Density was measured according to ISO 1183.

ESC test: A specimen having a length of 165 mm, a width of 19 mm, and a thickness of 3.2 mm, which is identical to that of a tensile strength measurement specimen according to ASTM D638, was fixed to a jig having a stress of 2.0% according to ISO 4599, 25 µl of a mixed solution containing isoamyl acetate, limonene, and linalool in a volume ratio of 4:1:1 was applied on the specimen using a micropipette, and then, after 2 hours, the specimen was examined with the naked eye for the occurrence of crazes or cracks. When no crazes or cracks occurred, it was marked as "o". When crazes or cracks occurred, it was marked as "X".

Friction noise properties (stick-slip noise): Each of acceleration, impulse, frequency, friction, and fluctuation was measured using a flat specimen having a size of 70 mm×60 mm and a flat specimen having a size of 25 mm×50 mm at a temperature of 23° C. and a relative humidity of 50% using a Ziegler SSP-04, a risk priority number (RPN) was calculated using Equation 2, and then friction noise properties were evaluated under the following four conditions: a specimen load of 10 N and a motion condition of 1 mm/s; a specimen load of 10 N and a motion condition of 4 mm/s; a specimen load of 40 N and a motion condition of 1 mm/s; and a specimen load of 40 N and a motion condition of 4 mm/s.

$$RPN = \frac{2^* grade_{energie\_rate} + grade_{impulse\_rate} + grade_{acceleration}}{4} \quad [\text{Equation 2}]$$

<Evaluation of Friction Noise Properties>

RPN of 1 or more and 3 or less: Good (very low probability of generating friction noise).

RPN of 4 or more and 5 or less: Partially good.

RPN of 6 or more and 10 or less: Poor.

Light resistance: The color difference change (ΔE) of each of a glossy specimen and an embossed specimen was measured at a temperature of 89±3° C., a relative humidity of 50±5%, an irradiation dose of 84 $MJ/m^2$, and an irradiance of 0.55±0.02 $W/m^2$·nm (wavelength range: 300 to 400 nm) according to MS210-05 or ISO 105. The glossy specimen was prepared at an injection temperature of 230° C. to 250° C. and a mold temperature of 50° C. using a mold that was mirror surface-finished with 2,000 grit to 40,000 grit, and the embossed specimen was prepared in the same manner as the above specimen except for using a mold having an embossed pattern having a size of 15 to 21 µm formed on the surface thereof.

In the case of the color difference change (ΔE), the color of a specimen was measured using a Hunter Lab color meter, and ΔE was calculated using Equation 3:

$$\Delta E = \sqrt{\{(L-L')^2 + (a-a')^2 + (b-b')^2\}}. \quad [\text{Equation 3}]$$

Injection metering deviation (seconds): Injection metering deviations of 30 shots were measured at an injection temperature of 230° C. and a mold temperature of 50° C. using a 600MT injection machine (ENGEL Co.), and the average value and standard deviation thereof were calculated.

TABLE 1

| Classification | Examples | | | | | |
|---|---|---|---|---|---|---|
| | 1 | 2 | 3 | 4 | 5 | 6 |
| A-1 (IV 1.3) | | | | | | |
| A-2 (IV 1.2) | | | | | 34 | |
| A-3 (IV 1.0) | 31 | 33 | 33.5 | 34 | | 34 |
| A-4 (IV 0.9) | | | | | | |
| A-5 (IV 0.8) | | | | | | |
| B | 28 | 27 | 27 | 27 | 27 | 27 |
| C | 39 | 38 | 38 | 38 | 38 | 38 |
| D-1 | | | | | 0.3 | 0.3 |
| D-2 | 1.3 | 1.3 | 0.8 | 0.3 | | |
| Antioxidant | 0.4 | 0.4 | 0.4 | 0.4 | 0.4 | 0.4 |
| UV absorber | 0.3 | 0.3 | 0.3 | 0.3 | 0.3 | 0.3 |

TABLE 1-continued

| Classification | Examples | | | | | |
|---|---|---|---|---|---|---|
| | 1 | 2 | 3 | 4 | 5 | 6 |
| Physical properties | | | | | | |
| Fluidity | 30 | 30 | 30 | 30 | 10 | 30 |
| Impact strength | 17.7 | 17.5 | 17.5 | 17.5 | 42.8 | 17.5 |
| Tensile strength | 40.5 | 40.5 | 40.5 | 40.5 | 40.5 | 40.5 |
| Flexural strength | 61.4 | 61.4 | 61.4 | 61.4 | 61.4 | 61.1 |
| Flexural modulus | 1840 | 1840 | 1840 | 1840 | 1840 | 1830 |
| Heat deflection temperature | 92.6 | 92.6 | 92.6 | 92.6 | 92.6 | 93.8 |
| Density | 1.11 | 1.11 | 1.11 | 1.11 | 1.11 | 1.11 |
| ESC test | ○ | ○ | ○ | ○ | ○ | ○ |
| Friction noise properties (10N, 1 mm/s) | 3 | 3 | 3 | 3 | 3 | 3 |
| Friction noise properties (10N, 4 mm/s) | 2 | 2 | 2 | 2 | 2 | 2 |
| Friction noise properties (40N, 1 mm/s) | 2 | 2 | 2 | 2 | 2 | 2 |
| Friction noise properties (40N, 4 mm/s) | 1 | 1 | 1 | 1 | 1 | 1 |
| Light resistance (glossy specimen) | 1.1 | 1.1 | 1.1 | 1.1 | 1.1 | 1.1 |
| Light resistance (embossed specimen) | 1.0 | 1.0 | 1.0 | 1.0 | 1.0 | 1.0 |
| Average of injection metering deviations | 11.45 | 11.58 | 15.82 | 18.01 | 13.22 | 19.02 |
| Standard deviation of injection metering deviations | 1.22 | 1.15 | 1.44 | 2.22 | 0.92 | 2.54 |

TABLE 2

| Classification | Examples | | | | |
|---|---|---|---|---|---|
| | 7 | 8 | 9 | 10 | 11 |
| A-1 (IV 1.3) | | | 34 | 25 | 40 |
| A-2 (IV 1.2) | 25 | 40 | | | |
| A-3 (IV 1.0) | | | | | |
| A-4 (IV 0.9) | | | | | |
| A-5 (IV 0.8) | | | | | |
| B | 31.5 | 24 | 27 | 31.5 | 24 |
| C | 42.5 | 35 | 38 | 42.5 | 35 |
| D-1 | | | | | |
| D-2 | 1.3 | 1.3 | 1.3 | 1.3 | 1.3 |
| Antioxidant | 0.4 | 0.4 | 0.4 | 0.4 | 0.4 |
| UV absorber | 0.3 | 0.3 | 0.3 | 0.3 | 0.3 |
| Physical properties | | | | | |
| Fluidity | 12 | 9 | 7 | 8 | 6 |
| Impact strength | 49.5 | 39.5 | 47.5 | 49.5 | 39.5 |
| Tensile strength | 40.0 | 41.0 | 41.0 | 40.0 | 41.0 |
| Flexural strength | 61.1 | 61.2 | 61.2 | 61.1 | 61.2 |
| Flexural modulus | 1860 | 1910 | 1860 | 1860 | 1910 |
| Heat deflection temperature | 93.8 | 90.8 | 92.8 | 93.8 | 90.8 |
| Density | 1.11 | 1.11 | 1.11 | 1.11 | 1.11 |
| ESC test | ○ | ○ | ○ | ○ | ○ |
| Friction noise properties (10N, 1 mm/s) | 3 | 3 | 3 | 3 | 3 |
| Friction noise properties (10N, 4 mm/s) | 2 | 2 | 2 | 2 | 2 |
| Friction noise properties (40N, 1 mm/s) | 2 | 2 | 2 | 2 | 2 |
| Friction noise properties (40N, 4 mm/s) | 1 | 1 | 1 | 1 | 1 |
| Light resistance (glossy specimen) | 1.1 | 1.1 | 1.1 | 1.1 | 1.1 |
| Light resistance (embossed specimen) | 1.0 | 1.0 | 1.0 | 1.0 | 1.0 |
| Average of injection metering deviations | 12.84 | 12.01 | 12.14 | 13.14 | 11.84 |
| Standard deviation of injection metering deviations | 0.86 | 0.94 | 0.88 | 0.81 | 0.88 |

TABLE 3

| Classification | Comparative Examples | | | | | |
|---|---|---|---|---|---|---|
| | 1 | 2 | 3 | 4 | 5 | 6 |
| A-1 (IV 1.3) | | | | | | |
| A-2 (IV 1.2) | | | | | | |
| A-3 (IV 1.0) | | | 34 | 45 | 27 | 42 |
| A-4 (IV 0.9) | 34 | | | | | |
| A-5 (IV 0.8) | | 34 | | | | |
| B | 27 | 27 | 34 | 30 | 22 | 13 |
| C | 38 | 38 | 31 | 24 | 50 | 44 |
| D-1 | 0.3 | 0.3 | 0.3 | 0.3 | 0.3 | 0.3 |
| D-2 | | | | | | |
| Antioxidant | 0.4 | 0.4 | 0.4 | 0.4 | 0.4 | 0.4 |
| UV absorber | 0.3 | 0.3 | 0.3 | 0.3 | 0.3 | 0.3 |
| Physical properties | | | | | | |
| Fluidity | 38 | 44 | 24 | 32 | 26 | 34 |
| Impact strength | 14.0 | 10.2 | 22.4 | 19.2 | 13.0 | 7.0 |
| Tensile strength | 40.0 | 40.0 | 35.6 | 31.9 | 38.0 | 43.5 |
| Flexural strength | 59.0 | 58.0 | 51.6 | 47.4 | 60.0 | 62.0 |
| Flexural modulus | 1850 | 1850 | 1480 | 1355 | 2100 | 2000 |
| Heat deflection temperature | 96.3 | 96.3 | 97.4 | 89.4 | 97.5 | 88.4 |
| Density | 1.11 | 1.11 | 1.11 | 1.12 | 1.10 | 1.12 |
| ESC test | X | X | ○ | ○ | X | ○ |
| Friction noise properties (10N, 1 mm/s) | 3 | 3 | 3 | 3 | 3 | 3 |
| Friction noise properties (10N, 4 mm/s) | 2 | 2 | 2 | 2 | 2 | 2 |
| Friction noise properties (40N, 1 mm/s) | 2 | 2 | 2 | 2 | 2 | 2 |
| Friction noise properties (40N, 4 mm/s) | 1 | 1 | 1 | 1 | 1 | 1 |
| Light resistance (glossy specimen) | 1.1 | 1.1 | 1.1 | 1.1 | 1.1 | 1.1 |
| Light resistance (embossed specimen) | 0.9 | 0.9 | 1.0 | 1.0 | 1.0 | 1.0 |
| Average of injection metering deviations | 20.14 | 22.28 | 19.32 | 22.14 | 20.32 | 18.52 |
| Standard deviation of injection metering deviations | 2.92 | 3.49 | 2.21 | 2.56 | 2.81 | 2.06 |

As shown in Tables 1 to 3, Examples 1 to 11 according to the present invention exhibit an excellent effect in the ESC test, injection moldability, and injection stability while exhibiting excellent mechanical properties, thermal stability, and friction noise resistance compared to Comparative Examples 1 to 6, which are outside the scope of the present invention.

As a notable result, in the case of Examples 5 and 7 to 11, in which the PBT resin has an intrinsic viscosity of 1.2 dl/g or more, an average value of injection metering deviations, which is an indicator of injection stability, is 13.5 seconds or less, and standard deviation is 1 second or less, indicating that injection moldability and injection stability are excellent.

As another notable result, in the same composition ratio, Example 4, which includes an ethylene bis-stearamide lubricant, the average value and standard deviation value of injection metering deviations are reduced compared to Example 6, which includes polyethylene wax, indicating that injection moldability and injection stability are improved. In addition, in the case of Examples 1 to 3 and Examples 7 to 11, in which a lubricant is included in an amount of 0.5% to 2.0% by weight, the average value of injection metering deviations is 16 seconds or less, and the standard deviation of injection metering deviations is 1.5 seconds or less, indicating that injection moldability and injection stability are excellent.

On the contrary, in the case of Comparative Example 1, in which the intrinsic viscosity of the PBT resin is 0.9 dl/g, and Comparative Example 2, in which the intrinsic viscosity of the PBT resin is 0.8 dl/g, the average value of injection metering deviations is 20 seconds or more, and the standard deviation of injection metering deviations is 2.92 seconds or more, indicating that injection moldability and injection stability are very poor.

In addition, in the case of Comparative Example 3, which includes an excess of the ABS resin, and Comparative Example 4, which includes an excess of the PBT resin and a small amount of the SAN resin, the average value and standard deviation value of injection metering deviations increase compared to Examples 1 to 11, indicating that injection stability is degraded.

In addition, in the case of Comparative Example 5, which includes the styrene-acrylonitrile copolymer (C) in an amount exceeding the range of the present invention, in the ESC test, crazes or cracks are observed. In the case of Comparative Example 6, which includes the acrylonitrile-butadiene-styrene graft copolymer (B) in an amount less than the range of the present invention, heat deflection temperature decreases significantly.

The invention claimed is:

1. A thermoplastic resin composition, comprising:
   25% to 40% by weight of a polyester resin (A);
   24% to 32% by weight of an acrylonitrile-butadiene-styrene graft copolymer (B); and
   35% to 43% by weight of a styrene-acrylonitrile copolymer (C),
   wherein the polyester resin (A) has an intrinsic viscosity of 1.0 to 1.3 dl/g,
   wherein the polyester resin (A) comprises one or more selected from the group consisting of polyethylene terephthalate (PET), polybutylene terephthalate (PBT), polytrimethylene terephthalate (PTT), and polyethylene naphthalate (PEN).

2. The thermoplastic resin composition according to claim 1, wherein the acrylonitrile-butadiene-styrene graft copolymer (B) is a copolymer prepared by graft-polymerizing 1% to 20% by weight of acrylonitrile, 40% to 80% by weight of butadiene, and 10% to 40% by weight of styrene.

3. The thermoplastic resin composition according to claim 1, wherein a weight of the polyester resin (A) is not less than that of the acrylonitrile-butadiene-styrene graft copolymer (B).

4. The thermoplastic resin composition according to claim 1, wherein the styrene-acrylonitrile copolymer (C) is a copolymer prepared by polymerizing 60% to 80% by weight of styrene and 20% to 40% by weight of acrylonitrile.

5. The thermoplastic resin composition according to claim 1, further comprising 0.1% to 5% by weight of a lubricant (D).

6. The thermoplastic resin composition according to claim 1, further comprising 0.1% to 5% by weight of one or more selected from the group consisting of an antioxidant and a UV absorber.

7. The thermoplastic resin composition according to claim 1, wherein an average of injection metering deviations of 30 shots of the thermoplastic resin composition under conditions of an injection temperature of 230° C. and a mold temperature of 50° C. using an injection machine is 19.1 seconds or less.

8. The thermoplastic resin composition according to claim 1, wherein a standard deviation of injection metering deviations of 30 shots of the thermoplastic resin composition under conditions of an injection temperature of 230° C. and a mold temperature of 50° C. using an injection machine is 2.6 seconds or less.

9. The thermoplastic resin composition according to claim 1, wherein the thermoplastic resin composition has no crazes or cracks, as observed 2 hours after applying 25 μl of a mixed solution containing isoamyl acetate, limonene, and linalool in a volume ratio of 4:1:1 to a specimen having a length of 165 mm, a width of 19 mm, and a thickness of 3.2 mm, which is identical to that of a tensile strength measurement specimen according to ASTM D638, fixed to a jig having a stress of 2.0% according to an environmental stress cracking (ESC) test according to ISO 4599.

10. The thermoplastic resin composition according to claim 1, wherein the thermoplastic resin composition has a flexural strength of 60 MPa or more and a flexural modulus of 1,800 MPa or more as measured using a specimen having a thickness of ⅛" at a span of 64 mm and a test speed of 2 mm/min according to ISO 178.

11. A molded article, comprising the thermoplastic resin composition according to claim 1.

12. The molded article according to claim 11, wherein the molded article is an automotive interior material.

* * * * *